United States Patent
Liu et al.

(10) Patent No.: US 12,271,709 B2
(45) Date of Patent: Apr. 8, 2025

(54) DEVICE AND METHOD FOR SELECTING TOP VALUES FROM A SET OF RAW VALUES

(71) Applicant: MONTAGE ELECTRONICS (SHANGHAI) CO., LTD., Shanghai (CN)

(72) Inventors: Zhijie Liu, Shanghai (CN); Jinfeng Ji, Shanghai (CN); Jie Dai, Shanghai (CN)

(73) Assignee: MONTAGE ELECTRONICS (SHANGHAI) CO, Shanghai (CN)

( * ) Notice: Subject to any disclaimer, the term of this patent is extended or adjusted under 35 U.S.C. 154(b) by 8 days.

(21) Appl. No.: 18/146,992

(22) Filed: Dec. 27, 2022

(65) Prior Publication Data
US 2023/0214178 A1    Jul. 6, 2023

(30) Foreign Application Priority Data

Dec. 31, 2021  (CN) .......................... 202111665241.4

(51) Int. Cl.
*G06F 16/901*   (2019.01)
*G06F 7/16*     (2006.01)
*G06F 16/23*    (2019.01)

(52) U.S. Cl.
CPC ............ *G06F 7/16* (2013.01); *G06F 16/2365* (2019.01); *G06F 16/901* (2019.01)

(58) Field of Classification Search
CPC ....... G06F 7/16; G06F 16/901; G06F 16/2365
See application file for complete search history.

(56) References Cited

U.S. PATENT DOCUMENTS

| | | | | |
|---|---|---|---|---|
| 5,873,122 | A | * | 2/1999 | Nishii ................. G06F 12/0215 711/119 |
| 2003/0028728 | A1 | * | 2/2003 | Ito ....................... G06F 12/0888 711/E12.021 |

(Continued)

FOREIGN PATENT DOCUMENTS

| | | | | |
|---|---|---|---|---|
| CN | 115391129 A | * | 11/2022 | |
| JP | 4135959 B2 | * | 8/2008 | ............. H04L 47/10 |

*Primary Examiner* — Tarek Chbouki
(74) *Attorney, Agent, or Firm* — Jun He Law Offices P.C; James J. Zhu

(57) ABSTRACT

The present application relates to a device for selecting top values from a set of raw values, comprising: an output queue, a loop queue, a top value storage module and a control module. The control module is configured to, at a higher priority, merge the intermediate sequence stored in the loop queue with the at most N top values stored in a storage area of the top value storage module, and sort the merged values to generate a merged sequence, until a predetermined number of storage areas in the top value storage module are traversed; wherein the control module is further configured to, when there is no intermediate sequence being stored in the loop queue, merge the output sequence with the at most N top values stored in a storage area of the top value storage module, and sort the merged values to generate a merged sequence; wherein the control module is further configured to provide a first subsequence in the merged sequence which is closer to a top most value of the merged sequence to the top value storage module to update the top value storage module, and provide a second subsequence in the merged sequence which is farther away from the top most value of the merged sequence to the loop queue to generate or update the intermediate sequence.

21 Claims, 4 Drawing Sheets

(56) References Cited

U.S. PATENT DOCUMENTS

| | | | |
|---|---|---|---|
| 2014/0269139 A1* | 9/2014 | Wang | G11C 11/40611 365/230.03 |
| 2015/0293974 A1* | 10/2015 | Loo | G06F 16/24568 707/752 |
| 2016/0234128 A1* | 8/2016 | Robertson | H04L 47/6215 |
| 2016/0378545 A1* | 12/2016 | Ho | G06F 11/302 718/107 |
| 2017/0041394 A1* | 2/2017 | Mortazavi | G06F 3/0631 |
| 2017/0351437 A1* | 12/2017 | Marinescu | G06F 3/0685 |
| 2019/0012242 A1* | 1/2019 | Özer | G06F 11/1629 |
| 2020/0019374 A1* | 1/2020 | Prathapan | G06F 5/065 |
| 2021/0044534 A1* | 2/2021 | Arakawa | H04L 47/6215 |
| 2021/0409283 A1* | 12/2021 | Smith | H04L 41/147 |
| 2022/0036167 A1* | 2/2022 | Li | G06F 7/5443 |
| 2022/0207017 A1* | 6/2022 | Gong | G06F 16/2365 |
| 2022/0215021 A1* | 7/2022 | Shan | G06F 16/2465 |
| 2023/0003826 A1* | 1/2023 | Parker | G01S 5/0205 |

* cited by examiner

DEVICE AND METHOD FOR SELECTING TOP VALUES FROM A SET OF RAW VALUES

FIELD OF THE INVENTION

The present application relates to the field of computer technology, and more particularly, to a device and method for selecting multiple top values from a set of raw values.

BACKGROUND OF THE INVENTION

It is a common problem in the field of computer technology to find the top values in massive data. In the existing technology, bitonic logic is usually used to select multiple top values (maximum values or minimum values) from a large data set. The algorithm of the bitonic logic first performs bitonic sorting on the large data set including the raw values, and then performs bitonic merging. After several cycles, the whole large data set will be sorted. In order to sort a large data set with the amount of data $k=2^n$ in bitonic logic, the total number of comparison operations is determined, that is, n (n+1)k/4 comparison operations are required.

As a sorting algorithm based on comparison operation and capable of parallel operation, the bitonic sorting is particularly suitable for hardware rather than software. However, the disadvantage of sorting processing based on hardware implementation is that it requires a lot of hardware logic cost. Moreover, once the maximum number of top values is selected, the hardware logic will be designed to meet the highest requirements to support the maximum number of top value operations. However, if it is not often required to calculate the maximum number of top values in the actual sorting process, many resources in the pre-designed hardware logic will be wasted.

Therefore, an improved device and method for selecting the top values are needed.

SUMMARY OF THE INVENTION

An object of the present application is to provide a device and method for selecting k top values from a set of raw values.

In one aspect of the present application, a device for selecting k top values from a set of raw values is provided. The device comprises: an output queue for receiving and storing sorted output sequences in batches, wherein each of the output sequences includes at most N values, where k and N are positive integers; a loop queue for storing an intermediate sequence, wherein the intermediate sequence includes at most N values; a top value storage module for storing k top values, wherein the top value storage module includes a plurality of storage areas, and each storage area is used for storing at most N top values; a control module coupled to the output queue, the loop queue and the top value storage module, wherein the control module is configured to, at a higher priority, merge the intermediate sequence stored in the loop queue with the at most N top values stored in a storage area of the top value storage module, and sort the merged values to generate a merged sequence, until a predetermined number of storage areas in the top value storage module are traversed; wherein the control module is further configured to, when there is no intermediate sequence being stored in the loop queue, merge the output sequence with the at most N top values stored in a storage area of the top value storage module, and sort the merged values to generate a merged sequence; wherein the control module is further configured to provide a first subsequence in the merged sequence which is closer to a top most value of the merged sequence to the top value storage module to update the top value storage module, and provide a second subsequence in the merged sequence which is farther away from the top most value of the merged sequence to the loop queue to generate or update the intermediate sequence.

In some embodiments, the device further comprises: an input queue for inputting and storing input sequences, wherein an input sequence includes at most N raw values; and a sorting module coupled to the input queue for receiving the input sequences in batches, and sorting the input sequences to obtain the respective output sequences, wherein the sorting module is further coupled to the output queue to provide the output sequences to the output queue.

In some embodiments, the device further comprises: a reading module for reading the input sequences from the input queue to the sorting queue in batches.

In some embodiments, the device further comprises: a pre-filter coupled at a front stage of the input queue, wherein the pre-filter is configured to receive a pre-filtering threshold, and filter the input raw values based on the pre-filtering threshold.

In some embodiments, the pre-filter is further coupled to the top value storage module to receive the pre-filtering threshold from the top value storage module.

In some embodiments, the pre-filtering threshold is a minimum value or a maximum value of the k top values stored in the top value storage module.

In some embodiments, the top value storage module further comprises a plurality of top value enable registers, wherein each of the top value enable registers is associated with a storage area for storing an enable flag to indicate whether the top value stored in the storage area is valid.

In some embodiments, the top value storage module further comprises a threshold register for storing a maximum value or a minimum value of the k top values stored in the top value storage module.

In some embodiments, the top value storage module further comprises a plurality of threshold registers, wherein each of the threshold registers is associated with a storage area for storing a maximum value or a minimum value of the top values stored in the storage area.

In some embodiments, the multiple storage areas have respective area storage address ranges, wherein the area storage address ranges are arranged sequentially.

In some embodiments, the respective sets of top values stored in the multiple storage areas are arranged sequentially.

In some embodiments, the top values stored in each storage area are arranged sequentially.

In some embodiments, the control module comprises: a flow controller configured for selecting the output sequence from the output queue or the intermediate sequence from the loop queue, wherein the flow controller is configured to, at a higher priority, select the intermediate sequence when the intermediate sequence is being stored in the loop queue.

In some embodiments, the flow controller is further configured to determine a maximum value or a minimum value of the intermediate sequence or the output sequence, and provide the maximum value or the minimum value to the top value storage module to select a storage area in the top value storage module.

In some embodiments, the top value storage module further comprises a plurality of threshold registers, wherein each of the threshold registers is associated with a storage area for storing the maximum or minimum value of the top values stored in the storage area; wherein the top value storage module is further configured to compare the maximum value or the minimum value provided by the flow controller with the maximum or minimum value of the top 5 values of each storage area stored in the plurality of threshold registers respectively to determine a storage area to be processed.

In some embodiments, the control module further comprises: a sorting scheduler configured for selecting a storage area from the top value storage module, wherein the first subsequence is provided to the storage area to update the top values stored in the storage area, after the top values stored in the storage area are selected to generate the merged sequence.

In some embodiments, the control module further comprises: a merging module for merging and sorting the output sequence or the intermediate sequence with the top values stored in a storage area of the top value storage module to generate the merged sequence.

In some embodiments, the merging module uses a bitonic merging and sorting algorithm.

In some embodiments, the control module comprises multiple pairs of flag registers and address registers, wherein each pair of flag register and address register is configured to mark information of values being processed by a data processing stage in the control module.

In some embodiments, the control module further comprises: a conflict checking module for comparing the information of values being processed by respective data processing stages, and determining whether a conflict occurs according to the comparison result.

In another aspect of the present application, a method for selecting k top values from a set of raw values is further provided. The method comprises: receiving and storing sorted output sequences in batches, wherein each of the output sequences includes at most N values, where k and N are positive integers; selecting at most N top values stored in a storage area in a top value storage module; merging an output sequence with the at most N top values in the storage area, and sorting the merged values to generate a merged sequence; providing a first subsequence of the merged sequence which is closer to a top most value to the top value storage module to update the top value storage module, and providing a second subsequence of the merged sequence which is farther from the top most value to a loop queue to generate an intermediate sequence; and repeatedly performing the following operations at least once to update the top value storage module until a predetermined number of storage areas in the top value storage module are traversed: reading the intermediate sequence in the loop queue; selecting the at most N top values stored in a storage area in the top value storage module; merging the intermediate sequence with the at most N top values in the storage area, and sorting the merged values to generate the merged sequence; and providing the first subsequence in the merged sequence which is closer to the top most value to the top value storage module to update the top value storage module, and providing the second subsequence which is farther from the top most value to the loop queue to update the intermediate sequence.

The above is an overview of the application, and there may be cases of simplification, generalization and omission of details. Therefore, those skilled in the art should realize that this part is only illustrative by example, and is not intended to limit the scope of the application in any way. This overview is neither intended to identify the key or necessary features of the subject matter to be protected, nor is it intended to serve as an aid in determining the scope of the subject matter to be protected.

BRIEF DESCRIPTION OF THE FIGURES

The above and other features of the present disclosure would be more clearly understood from the following description and appended claims, taken in conjunction with the accompanying drawings. It could be appreciated that these drawings depict only several embodiments of the present disclosure and are therefore not to be considered limiting of the scope of the present disclosure. The content of the present application would be elaborated more clearly and in detail by the way of the accompanying drawings.

The same reference numbers will be used throughout the drawings to refer to the same or like parts.

DETAILED DESCRIPTION OF THE INVENTION

Figure 1:
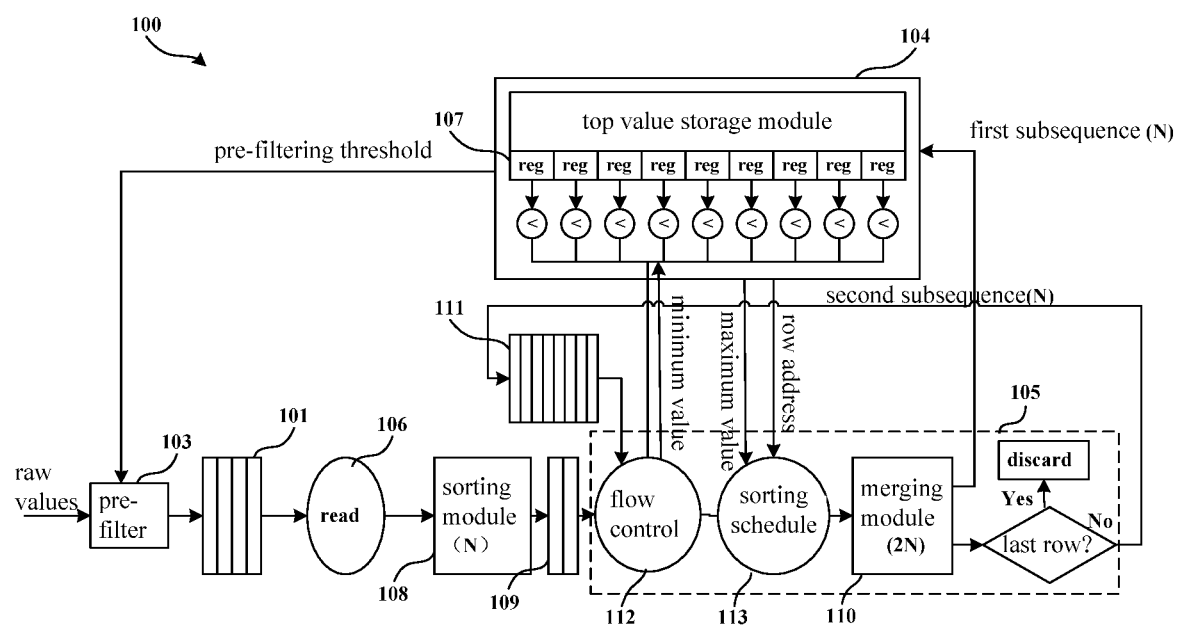
FIG. 1 illustrates a device for selecting the top value according to an embodiment of the present application.

The following detailed description refers to the accompanying drawings that form a part of the description. In the drawings, the same reference numbers usually refer to the same or like parts, unless the context dictates otherwise. The illustrative embodiments described in the detailed description, drawings, and claims are not intended to be limiting. Other embodiments may be utilized, and other modifications may be made, without departing from the spirit or scope of the subject matter of the present application. It could be appreciated that various configurations, substitutions, combinations, designs may be made to the various aspects of the content of the present application generally described in the present application and illustrated in the accompanying drawings, all of which expressly form a part of this disclosure.

FIG. 1 illustrates a device 100 for selecting the top value according to an embodiment of the present application. In some embodiments, the device can be configured to receive raw values from a set of raw values comprising a plurality of raw values, and select a plurality of top values, e.g., k top values, from the received raw values. The k top values can be k minimum values or k maximum values, depending on the top most value of sorting and selection. In some embodiments, the number of raw values included in the set of raw values may be relatively large, therefore the device 100 may receive the raw values in batches and process the raw values in batches. In the following, the operation process of the device 100 is described by example of processing one batch of raw values, but those skilled in the art would appreciate that processing of multiple batches of raw values can be repeated in a similar manner.

As shown in FIG. 1, the device 100 includes an input queue 101 for receiving raw values in batches. The raw values may be stored in a database or other memories external to the device 100. The input queue 101 may have a predetermined size of storage space, which for example may store N raw values, where N is a positive integer. Accordingly, the number of raw values that each batch of the input queue 101 can receive may not exceed the predetermined size, e.g., equal to N. In some embodiments, the device 100 may further include a pre-filter 103 upstream of the input queue 101 for receiving a pre-filtering threshold and comparing the raw values received from the outside with the pre-filtering threshold. Depending on the top most value to be selected, the pre-filter 103 can be configured to filter out raw values larger than the pre-filtering threshold (e.g., when the top value to be selected by the device 100 is the minimum value), or it can be configured to filter out raw values smaller than the pre-filtering threshold (e.g., when the top value to be selected by the device 100 is the maximum value). It could be appreciated that in the example of using the pre-filter 103, in some cases, the device 100 may receive, for example, N raw values per batch, and filter the N raw values, thereby the number of raw values actually provided to the input queue 101 may be less than or equal to N. In the case where the number of raw values provided to the input queue 101 is less than N, the device 100 can continue to store the input values (also filtered by the pre-filter 103) into the input queue 101 until the number of raw values stored in the input queue 101 reaches a predetermined number N. In the following embodiments, the input queue 101 stores N raw values, these values are then forwarded to the subsequent processing module and a batch of processing is conducted for illustration. However, those skilled in the art could appreciate that when the number of a batch of raw values stored in the input queue 101 is less than N, the device for selecting the top value according to the embodiment of the present application can perform processing similarly. For example, preset values can be added to the input queue 101 to keep N values (including raw values) processed in each batch.

The device 100 further includes a sorting module 108 coupled to the input queue 101 for receiving N values from the input queue 101 in batches. In some embodiments, the receipt of N values from the input queue 101 can be controlled by reading module 106. For example, the reading module 106 may periodically query the value storage situation in the input queue 101. After N values are stored in the input queue 101, they are read from the input queue 101 and sent to the sorting module 108. The sorting module 108 can further sort the values read from the input queue 101, for example, perform monotonic sorting, and the sorted values constitute an output sequence. Depending on the specific embodiments, the output sequence can be a monotonically increasing sequence or a monotonically decreasing sequence. In some embodiments, the sorting module 108 may be implemented using a Bitonic Sorting Algorithm, or other suitable sorting algorithms. In some embodiments, when the number of values read by the reading module 106 is less than N, the reading module 106 can supplement data at most N values and use the N values as an output sequence. It could be appreciated that the data to be supplemented can be equal to the pre-filtering threshold received by the pre-filter 103, for example.

The output sequence generated by the sorting module 108 can be sent to the output queue 109. The output queue 109 is coupled downstream of the sorting module 108, and is used to store the output sequence for processing by the subsequent stage circuit. In some embodiments, device 100 may include a control module 105 for controlling the retrieval of the output sequence from the output queue 109. The function and structure of the control module 105 will be further described below.

In order to sort the cumulatively received values while receiving the raw values in batches, the device 100 further includes a top value storage module 104. The top value storage module 104 can be coupled to the control module 105 to store and update a plurality of top values in the cumulatively received values under its control. It can be appreciated that when k top values are selected from a plurality of raw values (k is a positive integer), the top value storage module 104 can store k top values, wherein the k top values can be k maximum values or minimum values (depending on the top most value). As mentioned above, in this application, the selection of k minimum values from the raw values will be taken as an example for description. Those skilled in the art could appreciate that the selection of k maximum values from a plurality of raw values can be performed similarly, and details are not elaborated herein.

As previously mentioned, in some embodiments, the pre-filter 103 can receive a pre-filtering threshold for pre-filtering the raw values. In some embodiments, since the top value storage module 104 stores k maximum values, the pre-filter 103 can be coupled to the top value storage module 104 and receive the maximum value of the k minimum values (or the minimum value of the k maximum values, depending on the top most value) therefrom so as to use it as the pre-filtering threshold. In this way, during the sorting process, the raw values larger than the maximum value of the k minimum values stored in the top value storage module 104 will not enter the output queue and will not be subsequently processed, which can improve the efficiency of sorting processing.

Specifically, still referring to FIG. 1, the top value storage module 104 includes a plurality of storage areas, wherein each storage area is used to store a part of the top values. For example, each storage area can be represented by rows, respectively the first row, the second row, . . . , up to the $M^{th}$ row (in this embodiment, the $M^{th}$ row is the last row of the top value storage module 104). Each row of storage areas can be used to store at most N top values out of k top values, that is, M×N=k. In actual operation, each row of storage areas can store N top values, that is, the storage space of each row is used to store the top values. In some cases, in the initialization stage of the top value storage module 104 or when M×N<k, each row of storage areas can store less than N top values, that is, the storage space of each row is not all used for storing the top values. In some embodiments, the number of top values stored in each row of storage areas may be equal. In other embodiments, the number of top values stored in each row of storage areas may also be unequal (possibly in practice at some stage of the actual operation). Preferably, in some cases, the top value storage module 104 can set a default value for a storage area that is not fully occupied, so as to adjust the number of top values stored in each row of storage areas to be equal. In the following examples, N top values are stored in each row of storage areas for illustration, but the present application is not limited thereto.

In some embodiments, the N top values stored in each row of the storage area in the top value storage module 104 may be arranged in ascending order from small to large, or in descending order from large to small. In general, the storage unit in each row of storage areas is indexed by its address, so in the case of sequential arrangement, the sorting order of the N top values in a row of storage areas is the same as the changing order of the address of the storage unit in this row, or vice versa. Preferably, the sorting order of the top values can be the same as the changing order of the address of the storage unit, which is helpful for addressing the top values.

In addition, since the top value storage module 104 includes a plurality of rows, each row may have its corresponding row address (row_addr) for distinguishing different rows of the top value storage module 104. The row address is, for example, the storage address of the first storage unit in the row, or the first few bits of the storage address of the first storage unit (these bits are the common bits of all storage units in the row). In some embodiments, the row address of each row can increase sequentially from the first row to the last row, that is, the row address of the last row is greater than the row addresses of other rows.

Since the top value storage module 104 has multiple rows of the same storage area, in some preferred embodiments, some or all of these storage areas are configured to be valid, while the remaining storage areas are disabled. In this way, the number of top values stored in the top value storage module 104 can be adjusted to meet the actual requirements for top value selection. For example, in the case of the top value storage module 104 including 16 rows of storage areas, and each row of storage areas storing 8 top values, if 32 top values are to be selected from the raw values, only 4 rows of storage areas in the top value storage module 104 need to be valid, and the other 12 rows of storage areas can be disabled. Similarly, if 64 top values are to be selected from the raw values, only 8 rows of storage areas in the top value storage module 104 need to be valid. It could be concluded that the number of top values can be configured adaptively, which greatly improves the flexibility of top value selection.

In some embodiments, in order to enable or disable storage areas row by row, the top value storage module 104 can further include a plurality of top value enable registers 107, wherein each top value enable register 107 corresponds to a row of storage areas, which is used to store enable flag bits (data_valid). The enable flag bits indicate whether the top values stored in the row of storage areas are valid, that is, whether the row of storage areas can be used to store the top values. In some examples, data_valid=1 indicates that the row of top values is valid. In contrast, data_valid=0 indicates that the row of top values is invalid. For example, the flag bit data_valid=1 stored in the top value enable register 107 of the first row of the top value storage module 104 indicates that the top values stored in the first row are valid. In some embodiments, the top value enable register 107 can be a single-bit register. For another example, during the calculation of the top values, after the input raw values of each batch is compared with the top values stored in a certain row in the top value storage module 104, the flag bit of that row can be temporarily set to invalid (indicating that that row has already been compared), so that the input values will only continue to be compared with the top values stored in the other rows respectively. The operation and control logic of the top value enable register 107 will be further described below.

As previously described, the top value storage module 104 can provide the pre-filter 103 with the maximum value or minimum value (threshold) among all the top values stored therein. Accordingly, the top value storage module 104 can include a threshold register for storing the maximum value or minimum value among all the top values. In some embodiments, when the top value storage module 104 is not configurable, it is only necessary to provide a threshold register to store the maximum value or the minimum value. However, when the top value storage module 104 can be configured to enable a portion of the storage areas, the top value storage module 104 can include a plurality of threshold registers to increase flexibility, wherein each threshold register corresponds to a row of storage areas to store the maximum value (or the minimum value, depending on the top most value of k top values) of at most N top values stored in each row respectively. In this way, no matter how many rows of storage areas are enabled, the top value storage module 104 can include threshold registers that store the maximum value or minimum value among the top values stored in these storage areas, which further improves the flexibility of the device 100.

Figure 2:
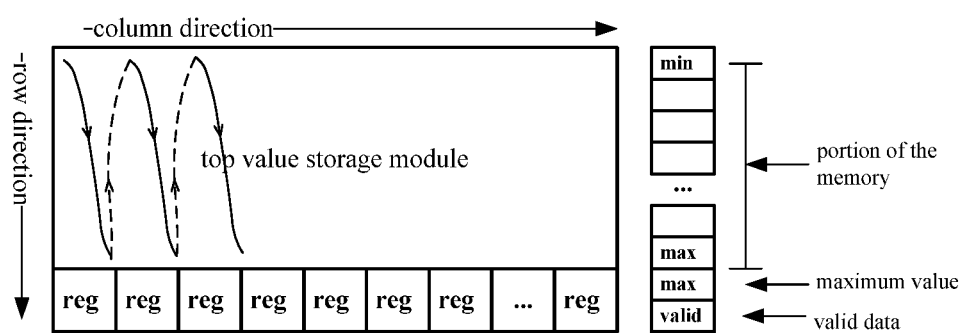
FIG. 2 illustrates an exemplary embodiment of the top value storage module shown in FIG. 1.

FIG. 2 illustrates an exemplary implementation of the top value storage module 104 shown in FIG. 1. As shown in FIG. 2, the top value storage module 104 includes multiple rows of storage areas, wherein each row of storage areas can store N top values in sequence. Preferably, the top values stored in these storage areas are also stored sequentially along the column direction. The directional arrows shown in FIG. 2 indicate the sorting direction of these top values. In some embodiments, these storage areas can be implemented by random access memories or similar storage media. In addition, the top value storage module 104 further includes a plurality of top value enable registers and threshold registers, which can be implemented by storage media other than random access memory.

Still referring to FIG. 1, in some embodiments, the top value storage module 104 can be a dual port memory. The dual port memory can include two sets of independent read/write control lines, so that the top value storage module 104 can be read and written in parallel, which is beneficial for improving the data processing capability.

It should be noted that, after the top value storage module 104 is reset or before the task of selecting k top values from the raw values starts, the top value storage module 104 can be initialized to write the k top values therein. Preferably, the k top values initially written in the top value storage module 104 can be the maximum values of the data types supported by each storage unit of the top value storage module 104.

Continuing to refer to FIG. 1, in addition to controlling the reading of the output sequence, the control module 105 is further configured to control the sorting of a batch of raw values output by the top value storage module 104 and the output queue 109, and to update the top values stored in the top value storage module 104.

Specifically, the control module 105 can be coupled to the output queue 109 to receive the output sequence. In addition, the control module 105 can further be coupled to a loop queue 111. The loop queue 111 is used to store an intermediate sequence, and the intermediate sequence may be a data sequence in the process of calculating the top values. Depending on the process of calculating the top values after each batch of raw values is input, the intermediate sequence may include a part of the values in the output sequence, and/or a part of the top values stored in the top value storage module 104. In the actual calculation process, the top value storage module 104 stores the k top values that have been sorted and selected before, and the output queue 109 provides the raw values that is not sorted together with the previous k top values. Therefore, as the calculation of the top values proceeds, one or more top values stored in the top value storage module 104 may be replaced by one or more raw values in the output sequence, until the k top values in all of the values jointly included by the top value storage module 104 and the output queue 109 are selected and stored in the top value storage module 104. Therefore, the values stored in the top value storage module 104 without replacement are stored in the loop queue 111, which constitute an intermediate sequence. In some embodiments, the control module 105 may sort the top values and the raw values in multiple loops, so in actual operation, the intermediate sequences may be generated multiple times, which will be described in detail below.

As mentioned above, since it is necessary to merge the values jointly included by the top value storage module 104 and the output queue 109, and calculate the k top values, the control module 105 is provided with a merging module 110. The merging module 110 is configured to combine N values stored in a row of storage areas in the output sequence or intermediate sequence and the top value storage module 104 selected by the control module 105. In some embodiments, the merging operation can be a bitonic merging and sorting operation, or any other suitable merging and sorting operation. One of the advantages of the bitonic merging and sorting operation is that it is implemented in a pipelined manner.

In some embodiments, the control module 105 may include a flow controller (Flow_ctrl) 112. Specifically, the flow controller 112 may be configured to select an output sequence from the output queue 109 or an intermediate sequence from the loop queue 111. In some examples, the intermediate sequence of the loop queue 111 has higher priority than the output sequence of the output queue 109. That is, if there are available intermediate sequences in the loop queue 111, the flow controller 112 will give priority to the intermediate sequences stored in the loop queue 111. It can be understood that when there is no available intermediate sequence in the loop queue 111, such as when the output sequence in the output queue 109 has just been created and is waiting to be read, the flow controller 112 can issue a data read instruction to the output queue 109 to read the output sequence from it.

As mentioned above, in some embodiments, the k top values stored in the top value storage module 104 are arranged sequentially, and the top values arranged sequentially are beneficial to retrieval. For example, the flow controller 112 can send the minimum value in the read output sequence or intermediate sequence to the top value storage module 104, so that the top value storage module 104 can compare the minimum value with the maximum value of the top values stored in each row of storage areas. In this way, if the minimum value is greater than the maximum value of the top values in a row of storage areas, it means that all values of the intermediate sequence or output sequence are greater than the top values in the row of the storage areas. If the selected direction of the top values is the minimum value, it is meaningless to merge and sort the intermediate sequence or output sequence with the top values in the row of the storage areas. If the minimum value is less than the maximum value of the top values in a row of the storage areas, it means that at least one values of the intermediate sequence or output sequence are less than at least one top values in the row of the storage areas. If the selected direction of the top values is the minimum value, at least one values of the intermediate sequence or output sequence shall replace at least one top values in the row of the storage areas. Therefore, it is necessary to merge and sort the intermediate sequence or output sequence with the top values in the row of the storage areas. It can be seen that the flow controller 112 sends the minimum value of the output sequence or intermediate sequence to the top value storage module 104, and the top value storage module 104 can be quickly addressed to determine which row of storage areas should be read.

The control module 105 may further include a sorting scheduler 113, which is coupled to the top value storage module 104 to control the selection of the top values in a row of storage areas from the top value storage module 104. In other words, when calculating the top values, a part of the top values (such as a row of the top values) in the top value storage module 104 is merged with the intermediate sequence or output sequence, and the sorting scheduler 113 is configured to select which row of values is used for merging. As mentioned above, when the top value storage module 104 determines which row of storage areas should be read, the sorting scheduler 113 can send a read instruction to the top value storage module 104 to read out the top values in the corresponding row of storage areas. It can be understood that, in some embodiments, the sorting scheduler 113 can also be controlled to read each row in the top value storage module 104 in sequence. Further functions of the sorting scheduler 113 will be detailed below.

In some embodiments, the control module is configured to select the intermediate sequence stored in the loop queue 111 for processing at a higher priority, and select the output sequence of the output queue 109 for processing when there is no intermediate sequence in the loop queue. Specifically, the flow controller 112 is configured to select the intermediate sequence stored in the loop queue 111 at a higher priority, and the sorting scheduler 113 reads the top values in the row of storage areas according to a certain row of storage areas in the determined top value storage module 104. The merging module 110 can perform a bitonic merging and sorting operation to the intermediate sequence and the N top values in the ith row of the top value storage module 104 to generate a merging sequence including 2N values, where $1 \leq i \leq M$ (the last row) and i is a positive integer. It can be understood that since the top value storage module 104 can include multiple rows of storage areas, the control module 105 can perform data and top value reading operations multiple times. When there is no intermediate sequence, the flow controller 112 can select to read the output sequence of the output queue 109, and the sorting scheduler 113 can select to read the top values of the first row in the top value storage module 104, or read the top values of other rows (in the case of addressing through the minimum value of the output sequence). In this way, the merging module 110 can perform a bitonic merging and sorting operation to the N raw values of the output sequence selected by the flow controller 112 and the N top values of a row in the top value storage module 104 to generate a merging sequence including 2N values.

The merging sequence obtained from the bitonic merging and sorting operation is a group of monotone sequences, such as a monotonically increasing sequence or a monotonically decreasing sequence. The control module 105 can divide the merged sequence into two groups of subsequences, wherein, the two groups of subsequences include the same number of values, wherein the subsequence which is closer to a top most value of the merged sequence is defined as the first subsequence (including N values), and the subsequence which is farther away from the top most value of the merged sequence is defined as the second subsequence (including N values). It can be understood that the values of the second subsequence are greater than those of the first subsequence.

After the bitonic merging and sorting, when a row of storage areas of the currently read top value storage module 104 is not the last row of the top value storage module 104, the control module 105 can instruct the merging module 110 to send the second subsequence to the loop queue 111 and store it as an intermediate sequence, so that the intermediate sequence can be called when waiting for the next merging operation. At the same time, the control module 105 can also instruct the merging module 110 to send the first subsequence to the top value storage module 104 and store it in the currently read row of storage areas. That is, the top values stored in the row of storage areas are updated. After such processing, the raw values in the output sequence or the original intermediate sequence that is less than a part of the top values in a row of the storage areas will be replaced in the row of the storage areas. Similarly, after several times of processing, all the smaller raw values in the output sequence will replace the relatively larger top values in the top value storage module 104, thus realizing a "local" selection of the top values. In this way, when the raw values of all batches are read and processed, the k top values of the raw values can be determined and stored in the top value storage module 104.

When a row of storage areas in the currently read top value storage module 104 is the last row of the top value storage module 104, the control module 105 can instruct the merging module 110 to send the first subsequence to the top value storage module 104 and store it in the currently read row of storage areas. That is, the top values stored in the row of storage areas are updated. However, at this time, the second subsequence in the merging module 110 is the largest batch of values left after traversing the top values of all the rows of storage areas, and these values can be discarded. Therefore, in this case, the control module 105 no longer needs to send the second subsequence to the loop queue 111, but can directly discard it. In some embodiments, the control module 105 may determine whether to discard values according to the enable flag bits. For example, when the enable flag bits are valid, the control module 105 can instruct to write the second subsequence back to the loop queue. When the enable flag bits are invalid, the control module 105 may instruct to discard the second subsequence.

Figure 3:
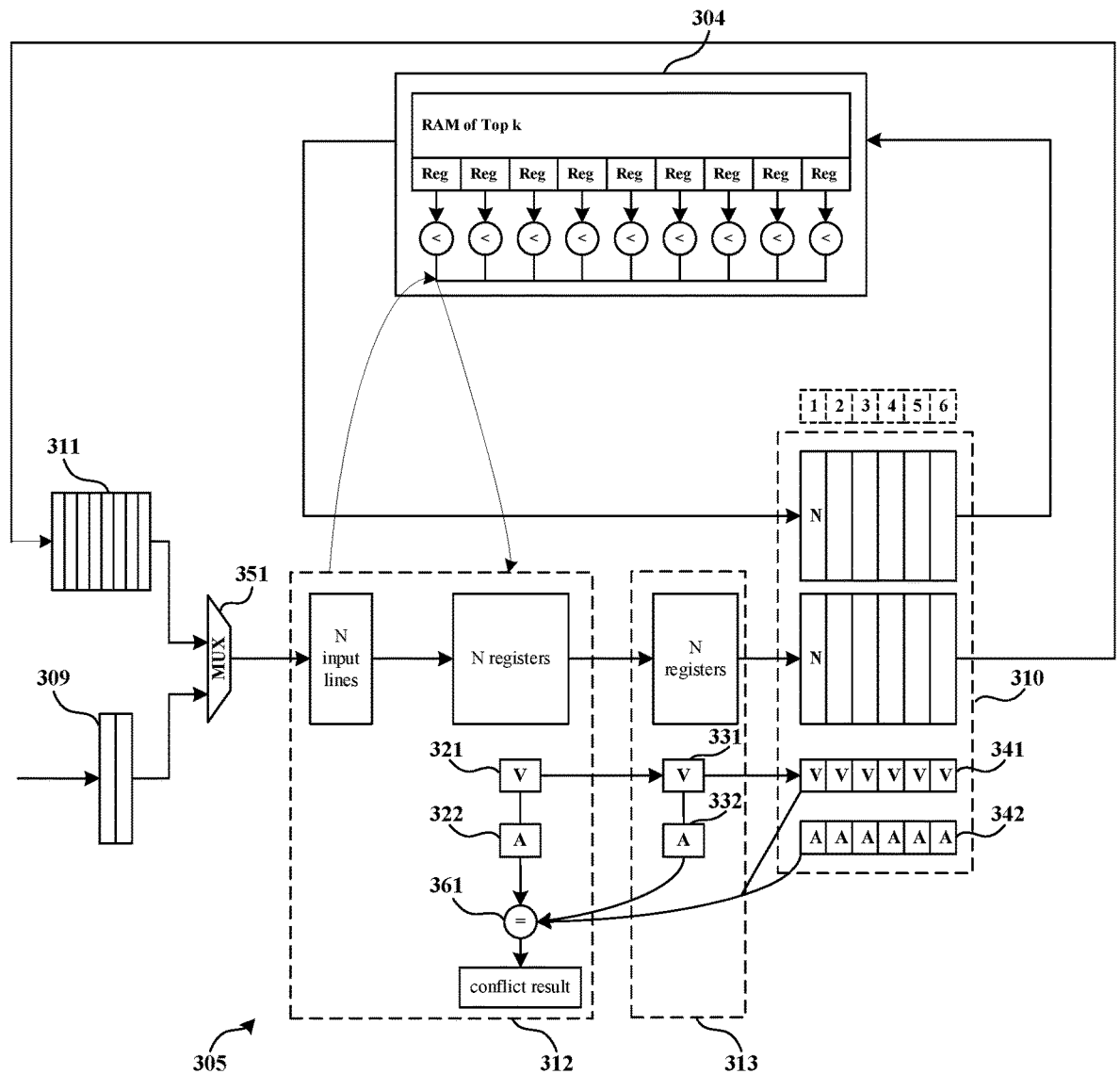
FIG. 3 illustrates a control logic circuit used by the control module according to an embodiment of the present application.

In some embodiments, the control module 105 will use some control logic circuits to avoid the risk of system errors caused by data conflicts, for example, to avoid the simultaneous merging of two sets of top values stored in multiple rows of storage areas. FIG. 3 shows the control logic circuit used by the control module according to one embodiment of the present application. It can be understood that the control module 305 shown in FIG. 3 can be applied to the device 100 shown in FIG. 1.

As shown in FIG. 3, the control module 305 includes a flow controller 312 and a sorting scheduler 313. In order to avoid data conflicts, the flow controller 312 has a flag bit register 321 for storing enable flag bits and an address register 322 for storing top value addresses, while the sorting scheduler 313 further has a flag bit register 331 for storing enable flag bits and an address register 332 for storing top value addresses. In this way, when the flow controller 312 or the sorting scheduler 313 processes a certain row of the top values, their respective flag bit register and address register will store the enable flag bit and row address (in the top value storage module) corresponding to the row of the top values.

Similarly, the merging module 310 may further have a flag bit register 341 and an address register 342 for storing the enable flag bits and row addresses of the values being processed in the merging module 310. It should be noted that, in some embodiments, the merging module 310 can use a bitonic merging and sorting algorithm or a similar pipelined merging/sorting algorithm. Therefore, the merging module 310 can have multiple processing stages inside, and each processing stage can have its respective flag bit register and address register to mark the relevant information of the values in the processing stage. For example, FIG. 3 shows that the merging module 310 has six processing stages, so the flag bit register 341 and the address register 342 have six subunits, respectively.

In operation, when the control module 305 is ready to read the top values from the top value storage module 304, it first reads the output sequence or intermediate sequence from the output queue 309 or the loop queue 311 via the multiplexer 351. After determining the minimum value in the read out sequence, the flow controller 312 provides the minimum value to the top value storage module 304, and then the top value storage module 304 searches a matching row of storage areas based on the minimum value, wherein the minimum value should be less than the maximum value of all the top values stored in the row of storage areas. Then, the flow controller 312 stores the enable flag bit and the row address of the row of storage areas in the flag bit register 321 and the address register 322, respectively. Then, the sorting scheduler 313 receives the enable flag bit and the row address of the row of storage areas from the flow controller 312 and stores them in the flag bit register 331 and the address register 332, respectively. At the same time, the sorting scheduler 313 also reads the top values in the row of storage areas, as well as the intermediate sequence or output sequence, from the top value storage module 304 based on the row address. Subsequently, these top values and sequences will be provided to the merging module 310 for merging and sorting processing. At the same time, the corresponding enable flag bits and row addresses are also sent to the flag bit register 341 and the address register 342 and stored therein.

In some embodiments, after the merging module 310 completes the merging and sorting process, it can check the enable flag bit corresponding to the currently processed values. When the enable flag bit is determined to be valid, the merging module 310 can send the second subsequence back to the loop queue 311. On the contrary, when determining that the enable flag bit is invalid, the merging module 310 may discard the second subsequence. On the other hand, according to the row address stored in the address register 342, the merging module 310 can send the first subsequence back to the storage areas corresponding to the top value storage module 304, so as to update the top values in the row of storage areas. It can be understood that whether the enable flag bit is valid may affect the update of the top values in the storage areas. In some examples, if not enabled, the merging module may discard both the first sequence and the second sequence.

Based on the enable flag bits and row addresses stored in the flag bit register 321 and the address register 322, the flag bit register 331 and the address register 332, the flag bit register 341 and the address register 342, the control module 305 further provides a conflict checking module 361 to perform conflict check. Specifically, the conflict checking module 361 can compare the enable flag bits and row addresses stored in the flag bit register 321 and the address register 322 with the enable flag bits and row addresses stored in the flag bit register 331 and the address register 332, the flag bit register 341 and the address register 342 respectively. If these row addresses are the same, the control module 305 will not write the values in the flow controller 312 to the sorting scheduler 313, since the same values have been sent to the sorting scheduler 313 or the merging module 310. In this way, the top values stored in different rows of storage areas in the top value storage module 304 will not have a writing or processing conflict. If these row addresses are different, it means that the flow controller 312 has read new values, then the control module 305 can write the values in the flow controller 312 to the sorting scheduler 313 to further perform merging and sorting processing through the merging module 310. It can be understood that the update of the row address in the flow controller 312 is based on the following conditions: there is available data in the loop queue 311 or the output queue 309, and there is no row addresses conflict in the flow controller 312.

Figure 4:
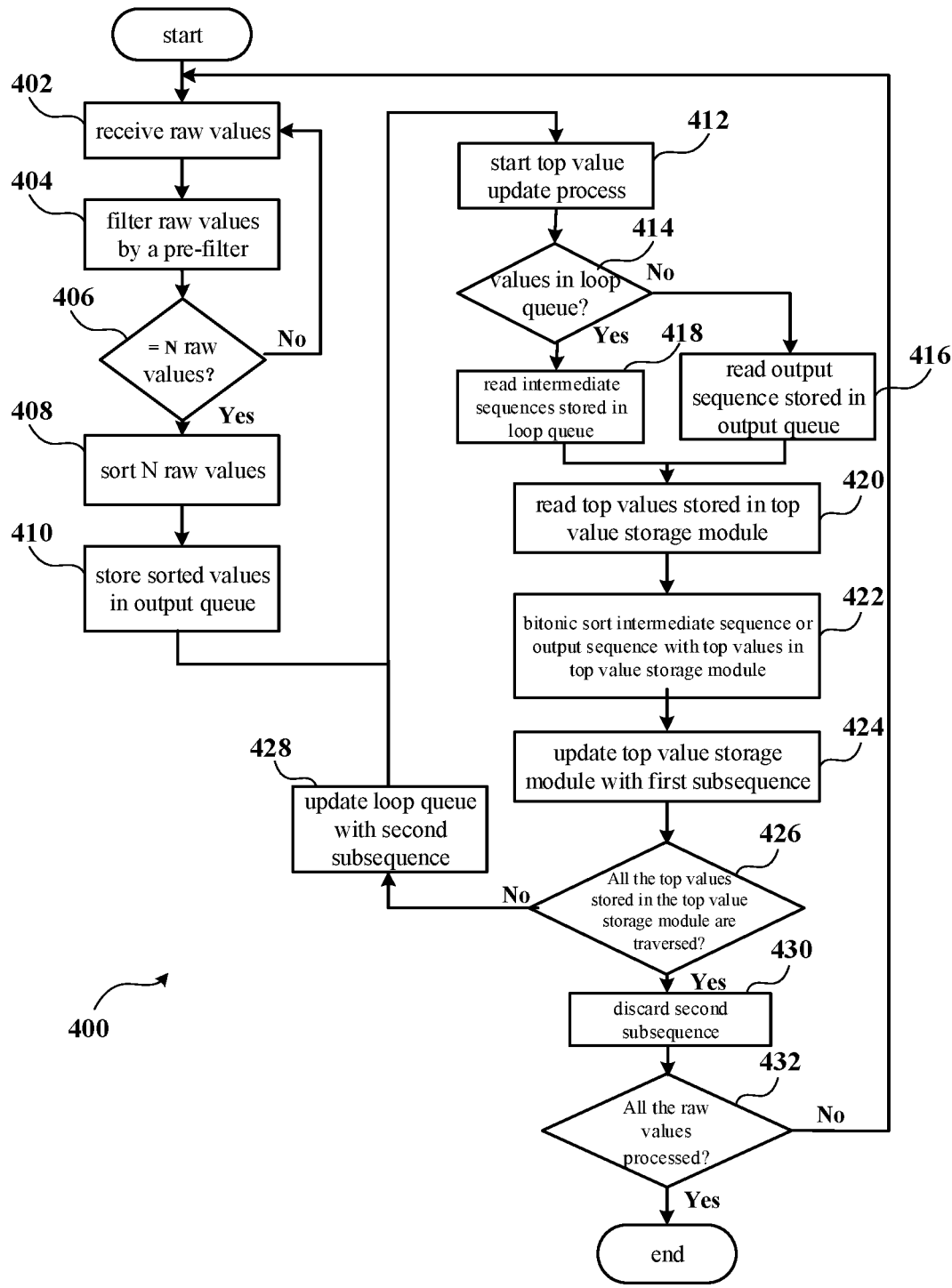
FIG. 4 illustrates a method for selecting the top value according to an embodiment of the present application.

FIG. 4 shows a method 400 for selecting the top values according to an embodiment of the present application. For the purpose of description, the method 400 will be described below in combination with the device 100 shown in FIG. 1. However, those skilled in the art can understand that the method 400 can also be performed by other devices. In addition, for the purpose of description, in the following, N values in the input sequence of a batch are described as $a_1$, $a_2$, $a_3$ ... ax, while the top value storage module 104 is configured to store k minimum values, and the top value storage module 104 includes M rows of storage areas (the $M^{th}$ row is the last row). Each row stores N values, where k=M*N, and M, N are positive integers. Based on the above description, the values in the first row are described as $b_1$, $b_{12}$, $b_{13}$ ... $b_{1N}$, the values in the second row are described as including $b_{21}$, $b_{22}$, $b_{23}$ ... $b_{2N}$, until the values in the $M^{th}$ row are described as including $b_{m1}$, $b_{m2}$, $b_{m3}$ ... $b_{mN}$. Since the k minimum values in the top value storage module 104 are arranged sequentially, $b_{mN}$ is the maximum value in the top value storage module 104, which can be used as the pre-filtering threshold.

As shown in FIG. 4, the method 400 starts from step 402, and the device 100 receives a batch of N raw values from the set of raw values stored in a database or other memory.

In step 404, N raw values received from the set of raw values are filtered by the pre-filter 103. Specifically, each of the N raw values in this batch can be compared with the pre-filtering threshold provided by the top value storage module 104. In step 406, if each of the N raw values is greater than the pre-filtering threshold, the N values will be discarded. If the values in the N raw values are less than or equal to the pre-filtering threshold, the input queue 101 can receive the N raw values for subsequent processing. In some cases, if the number of the received raw values are less than N, the device 100 automatically fills in the maximum value of the top value storage module 104 (for example, +INF if the data type is floating type) until N raw values are received in the input queue 101. In this way, the input queue 101 receives and stores N pre-filtered raw values, forming an input sequence ($a_1$, $a_2$, $a_3$ ... $a_N$).

In step 408, a sorting module 108 reads the input sequence ($a_1$, $a_2$, $a_3$ ... $a_N$) of the input queue 101 and sorts the input sequence ($a_1$, $a_2$, $a_3$ ... $a_N$). In some embodiments, the input sequence ($a_1$, $a_2$, $a_3$ ... $a_N$) can be sorted using a bitonic sorting algorithm. The bitonic sorting algorithm is a parallel sorting algorithm that uses bitonic sequences to generate sorted arrays. Those skilled in the art can understand that the sorting module 108 can also use other algorithms to sort the input sequences. The sequence ($a_1'$, $a_2'$, $a_3'$ ... ax') is obtained through the parallel sorting algorithm. The sequence is a monotonically increasing sequence or a monotonically decreasing sequence. In step 410, the output queue 109 receives and stores this sequence to form an output sequence ($a_1'$, $a_2'$, $a_3'$ ... $a_N'$).

After that, the method 400 continues to step 412, and the control module 105 starts to update the top values stored in the top value storage module 104. In step 414, since the loop queue 111 has a higher priority, the control module 105 can detect whether there are values in the loop queue 111. If there is no value in the loop queue 111, the control module 105 processes the output sequence in the output queue. In step 416, the control module 105 instructs to read the output sequence stored in the output queue 109. On the contrary, if there are values in the loop queue 111, the control module 105 gives priority to processing the intermediate sequence in the loop queue 111. In step 418, the control module 105 instructs to read the values stored in the loop queue 111, that is, the intermediate sequence.

In step 420, the control module 105 also reads the top values stored in the top value storage module 104. For the reading step of the top values in the top value storage module 104, please refer to the relevant description of the embodiment of FIG. 1 in this application.

In step 422, the merging module 110 can merge and sort the output sequence or intermediate sequence and N top values. Taking the output sequence as an example, the merging module 110 merges and sorts the output sequence ($a_1'$, $a_2'$, $a_3'$ ... $a_N'$) and N values ($b_{i1}$, $b_{i2}$, $b_{i3}$ ... $b_{iN}$) stored in the ith row of the top value storage module 104, wherein i=1, 2, 3 ... M. The bitonic sorting algorithm can be used to sort two monotone sequences, and the merging sequence ($c_1$, $c_2$, $c_3$ ... $c_N$, $c_{N+1}$ ... $c_{2N}$) can be obtained by bitonic merging and sorting operations. The merging sequence is a monotonically increasing sequence or a monotonically decreasing sequence. The merging sequence generated is divided into two groups of subsequences, wherein the two groups of subsequences include the same number of values. The subsequence which is closer to a top minimum value of the merged sequence is defined as the first subsequence ($c_1$, $c_2$, $c_3$ ... $c_N$), and the subsequence which is farther away from the top minimum value of the merged sequence is defined as the second subsequence ($c_{N+1}$, $c_{N+2}$, $c_{N+3}$ ... $c_{2N}$).

Next, in step 424, the control module 105 can determine whether all valid top value storage areas in the top value storage module 104 have been traversed. If the traversal is not completed, in step 426, the control module 105 can update the top value storage module 104 and the loop queue 111 with the first subsequence and the second subsequence, respectively, and then return to step 412. On the contrary, if it is determined in step 424 that all valid top value storage areas have been traversed, the method 400 continues with step 430, the control module 105 updates the top value storage module 104 with the first subsequence, and discards the second subsequence. Subsequently, in step 432, the control module 105 determines whether all the raw values have been processed. If not, return to step 402 and start receiving a new batch of the raw values. If the processing is completed, the method 400 ends.

It should be noted that although several modules or submodules, steps or sub steps of devices or methods for selecting the k top values from a set of raw values have been mentioned in the above detailed description, such division is exemplary and not mandatory. Practically, according to the embodiments of the present application, the features and functions of two or more modules described above can be embodied into one module. In contrast, the features and functions of a module described above can be further divided into multiple modules to be embodied.

Those skilled in the art can understand and implement other variations to the disclosed embodiments from a study of the specification, the disclosure and accompanying drawings, and the appended claims. In the claims, the word "comprising" does not exclude other elements or steps, and the indefinite article "a" or "an" does not exclude a plurality. In applications according to present application, one element may conduct functions of several technical feature recited in

What is claimed is:

1. A device for selecting k top values from a set of raw values, the device comprising:
an output queue storage module having a predetermined size of storage space for receiving and storing sorted output sequences in batches, wherein each of the output sequences includes at most N values, where k and N are positive integers;
a loop queue storage module having a predetermined size of storage space for storing an intermediate sequence, wherein the intermediate sequence includes at most N values;
a top value storage module for storing k top values, wherein the top value storage module includes a plurality of storage areas, and each storage area is used for storing at most N top values; and
a control module coupled to the output queue storage module, the loop queue storage module and the top value storage module, wherein the control module is configured to perform the follow steps:
merging the output sequences with at most N top values stored in a storage area to be processed of the top value storage module,
sorting the merged values to generate a merged sequence including at most 2N values,
providing a first subsequence of the merged sequence to the storage area to be processed of the top value storage module to update the values stored in the storage area, wherein the first subsequence includes at most N values in the merged sequence which is closer to a top most value of the merged sequence,
providing a second subsequence of the merged sequence to the loop queue storage module to generate or update the intermediate sequence, wherein the second subsequence includes at most N values in the merged sequence which is farther away from the top most value of the merged sequence,
repeatedly performing the following steps until all values stored in the storage areas to be processed of the top value storage module are updated:
selecting the intermediate sequence stored in the loop queue storage module;
selecting the at most N top values stored in another storage area to be processed of the top value storage module;
merging the selected intermediate sequence with the selected at most N top values,
sorting the merged values to generate another merged sequence,
providing another first subsequence of the another merged sequence to the another storage area to be processed of the top value storage module to update the values stored in the another storage area, wherein the another first subsequence includes at most N values in the another merged sequence which is closer to a top most value of the another merged sequence,
if not all values stored in the storage areas to be processed of the top value storage module are updated, providing another second subsequence of the another merged sequence to the loop queue storage module to update the intermediate sequence, wherein the another second subsequence includes at most N values in the another merged sequence which is farther from the top most value of the another merged sequence.

2. The device of claim 1, further comprising:
an input queue storage module having a predetermined size of storage space for receiving and storing input sequences, wherein an input sequence includes at most N raw values; and
a sorting module coupled to the input queue storage module for receiving the input sequences in batches, and sorting the input sequences to obtain the respective output sequences, wherein the sorting module is further coupled to the output queue storage module to provide the output sequences to the output queue storage module.

3. The device of claim 2, further comprising:
a reading module for reading the input sequences from the input queue storage module to the sorting module in batches.

4. The device of claim 2, further comprising:
a pre-filter coupled at a front stage of the input queue storage module, wherein the pre-filter is configured to receive a pre-filtering threshold, and filter the input raw values based on the pre-filtering threshold.

5. The device of claim 4, wherein the pre-filter is further coupled to the top value storage module to receive the pre-filtering threshold from the top value storage module.

6. The device of claim 5, wherein the pre-filtering threshold is a minimum value or a maximum value of the k top values stored in the top value storage module.

7. The device of claim 1, wherein the top value storage module further comprises a threshold register for storing a maximum value or a minimum value of the k top values stored in the top value storage module.

8. The device of claim 1, wherein the top value storage module further comprises a plurality of threshold registers, wherein each of the threshold registers is associated with a storage area for storing a maximum value or a minimum value of the top values stored in the storage area.

9. The device of claim 1, wherein the multiple storage areas have respective area storage address ranges, wherein the area storage address ranges are arranged sequentially.

10. The device of claim 9, wherein the respective sets of top values stored in the multiple storage areas are arranged sequentially.

11. The device of claim 10, wherein the top values stored in each storage area are arranged sequentially.

12. The device of claim 1, wherein the control module comprises:
a flow controller configured for selecting the output sequence from the output queue storage module or the intermediate sequence from the loop queue storage module, wherein the flow controller is configured to, at a higher priority, select the intermediate sequence when the intermediate sequence is being stored in the loop queue storage module.

13. The device of claim 12, wherein the flow controller is further configured to determine a maximum value or a minimum value of the intermediate sequence or the output sequence, and provide the maximum value or the minimum value to the top value storage module to select a storage area in the top value storage module.

14. The device of claim 13, wherein the top value storage module further comprises a plurality of threshold registers, wherein each of the threshold registers is associated with a storage area for storing the maximum or minimum value of the top values stored in the storage area;

wherein the top value storage module is further configured to compare the maximum value or the minimum value provided by the flow controller with the maximum or minimum value of the top values of each storage area stored in the plurality of threshold registers respectively to determine a storage area to be processed.

15. The device of claim 1, wherein the control module further comprises:
a sorting scheduler configured for selecting a storage area from the top value storage module, wherein the first subsequence is provided to the storage area to update the top values stored in the storage area, after the top values stored in the storage area are selected to generate the merged sequence.

16. The device of claim 1, wherein the control module further comprises:
a merging module for merging and sorting the output sequence or the intermediate sequence with the top values stored in a storage area of the top value storage module to generate the merged sequence.

17. The device of claim 16, wherein the merging module uses a bitonic merging and sorting algorithm.

18. The device of claim 1, wherein the control module comprises multiple pairs of flag registers and address registers, wherein each pair of flag register and address register is configured to mark information of values being processed by a data processing stage in the control module.

19. The device of claim 18, wherein the control module further comprises:
a conflict checking module for comparing the information of values being processed by respective data processing stages, and determining whether a conflict occurs according to the comparison result.

20. The device of claim 1, wherein the top value storage module further comprises a plurality of top value enable registers, wherein each of the top value enable registers is associated with a storage area for storing an enable flag to indicate whether the top value stored in the storage area is valid.

21. A method for selecting k top values from a set of raw values comprising:
receiving and storing sorted output sequences in batches, wherein each of the output sequences includes at most N values, where k and N are positive integers;
selecting at most N top values stored in a storage area to be processed of a top value storage module;
merging an output sequence with the at most N top values in the storage area to be processed, and sorting the merged values to generate a merged sequence including at most 2N values;
providing a first subsequence of the merged sequence to the storage area to be processed of the top value storage module to update the values stored in the storage area of the top value storage module, wherein the first subsequence includes at most N values in the merged sequence which is closer to a top most value of the merged sequence;
providing a second subsequence of the merged sequence to a loop queue storage module to generate or update an intermediate sequence, wherein the second subsequence includes at most N values in the merged sequence which is farther away from the top most value of the merged sequence; and
repeatedly performing the following steps at least once to update all the storage areas to be processed of the top value storage module until all values stored in the storage areas to be processed of the top value storage module are updated:
selecting the intermediate sequence in the loop queue storage module;
selecting the at most N top values stored in another storage area to be processed of the top value storage module;
merging the selected intermediate sequence with the selected at most N top values
sorting the merged values to generate another merged sequence; and
providing another first subsequence in the another merged sequence to the another storage area to be processed of the top value storage module to update the values stored in the another storage area of the top value storage module, wherein the another first subsequence includes at most N values in the another merged sequence which is closer to a top most value of the another merged sequence,
if not all values stored in the storage areas to be processed of the top value storage module are updated, providing another second subsequence of the another merged sequence to the loop queue storage module to update the intermediate sequence, wherein the another second subsequence includes at most N values in the another merged sequence which is farther from the top most value of the another merged sequence.

* * * * *